(12) United States Patent
Alling et al.

(10) Patent No.: US 7,349,889 B1
(45) Date of Patent: Mar. 25, 2008

(54) SYSTEM AND METHOD FOR REMOTELY DIAGNOSING FAULTS

(75) Inventors: Eric R. Alling, Upton, MA (US); Clare R. Sokolowski, Boston, MA (US)

(73) Assignee: Rohm and Haas Electronic Materials LLC, Marlborough, MA (US)

( * ) Notice: Subject to any disclaimer, the term of this patent is extended or adjusted under 35 U.S.C. 154(b) by 1038 days.

(21) Appl. No.: 09/716,653

(22) Filed: Nov. 20, 2000

(51) Int. Cl.
*G06F 11/07* (2006.01)

(52) U.S. Cl. .............................. 706/46; 706/45; 706/47; 706/48; 706/911; 706/912; 706/913; 706/914; 706/915; 706/916; 714/100; 714/2; 714/25; 714/26; 714/37; 714/46; 714/47

(58) Field of Classification Search ......... 706/47, 706/50–52, 46, 60, 48, 45, 61, 53, 62; 718/102; 714/100, 2, 4, 5, 10, 14, 15, 25–27, 46–48, 714/737, 30, 37, 57

See application file for complete search history.

(56) References Cited

U.S. PATENT DOCUMENTS

| | | | | |
|---|---|---|---|---|
| 5,127,005 A * | 6/1992 | Oda et al. | ...................... | 714/26 |
| 5,157,668 A * | 10/1992 | Buenzli et al. | ................ | 714/26 |
| 5,388,189 A * | 2/1995 | Kung | ........................... | 706/45 |
| 5,448,722 A * | 9/1995 | Lynne et al. | .................... | 706/49 |
| 5,497,335 A * | 3/1996 | Hoeller | ........................ | 700/143 |
| 5,644,686 A * | 7/1997 | Hekmatpour | ................. | 706/45 |
| 6,006,016 A * | 12/1999 | Faigon et al. | .................. | 714/48 |
| 6,012,152 A * | 1/2000 | Douik et al. | .................... | 714/26 |
| 6,275,559 B1 * | 8/2001 | Ramani et al. | ................. | 378/4 |
| 6,453,435 B1 * | 9/2002 | Limon et al. | ................ | 714/724 |
| 6,535,865 B1 * | 3/2003 | Skaaning et al. | ............. | 706/52 |
| 6,788,315 B1 * | 9/2004 | Kekic et al. | ................ | 715/733 |

OTHER PUBLICATIONS

Kuji et al; Marginal fault diagnosis based on e-beam static fault imaging with CAD; International Test Conference Proceedings; Sep. 10-14, 1990; pp. 1049-1054.*
Allred et al; A system for fault diagnosis in electronic circuits using thermal imaging; IEEE Systems Readiness Technology AUTOTESTCON '92 Conference Record; Sep. 21-24, 1992; pp. 455-458.*

* cited by examiner

*Primary Examiner*—David Vincent
*Assistant Examiner*—Omar F Fernández Rivas
(74) *Attorney, Agent, or Firm*—Anne Davis Barry; S. Matthew Cairns

(57) ABSTRACT

A method and system for diagnosing a fault that includes a decision tree having a plurality of decision points wherein at least some of the plurality of decision points terminate in a resolution point representing a diagnosis for the fault. Also included is a plurality of queries each having at least a first response and a second response where each of the plurality of queries being associated with one of the plurality of decision points. The system also includes a knowledge base that includes a plurality of first images where each of the plurality of first images illustrate one of the first responses. A user interface is included for presenting the plurality of queries and the illustrative first images to a user. The user navigates the decision tree by responding to at least some of the plurality of queries by viewing the illustrative first images and basing a selection between the first response and the second response associated with said at least some of said queries on said illustrative first images. Finally, the fault is diagnosed when the user navigates the decision tree until the resolution point is reached.

24 Claims, 5 Drawing Sheets

SYSTEM AND METHOD FOR REMOTELY DIAGNOSING FAULTS

BACKGROUND

The following invention relates to a method and system for providing engineering support services and, in particular to a method and system for remotely diagnosing and resolving a technical problem associated with a product or service.

Customers of technically sophisticated products and services often require technical support to properly use the product or service. For example, to implement Shipley's ultrafill copper electrolyte electroplating process requires specific engineering expertise. Thus, sellers of technical products and services typically make available engineers and technicians to respond to requests for technical support from their customers. For some support requests, the engineer can determine the underlying problem and implement a resolution remotely, for example through a telephone call with the customer. In many cases, however, in order to properly service the customer, the engineer must observe the problem first hand because the customer is not sufficiently skilled in identifying and describing the symptoms of the problem. In such cases, the engineer must either go to the customer's location or, if feasible, have the product in question shipped to the engineer so that the engineer can correctly diagnose and repair the problem. In either case, however, because qualified engineers are costly to train and maintain, the cost of providing competent technical support is high and is often reflected in increased product costs. More typically, the service provider is not able to staff sufficient qualified engineers which results in inefficient and slow customer support, especially if on-site service is required.

Accordingly, it is desirable to provide a system and method for providing engineering and technical support services to remotely diagnose and resolve a technical problem associated with a technical product or service.

SUMMARY OF THE INVENTION

The present invention is directed to overcoming the drawbacks of the prior art. Under the present invention a method and system is provided for diagnosing a fault and includes a decision tree having a plurality of decision points wherein at least some of the plurality of decision points terminate in a resolution point representing a diagnosis for the fault. Also included is a plurality of queries each having at least a first response and a second response where each of the plurality of queries being associated with one of the plurality of decision points. The system also includes a knowledge base that includes a plurality of first images where each of the plurality of first images illustrate one of the first responses. A user interface is included for presenting the plurality of queries and the illustrative first images to a user. The user navigates the decision tree by responding to at least some of the plurality of queries by veiwing the illustrative first images and basing a selection between the first response and the second response associated with said at least some of said queries on said illustrative first images. Finally, the fault is diagnosed when the user navigates the decision tree until the resolution point is reached.

In an exemplary embodiment, the knowledge base includes a plurality of second images where each of the plurality of second images illustrate one of the second responses wherein the user interface presents the illustrative second images to the user so that the user may respond to the at least some of the plurality of queries by veiwing the illustrative second images.

In another exemplary embodiment, the knowledge base includes a diagnostic image illustrating the diagnosis of the fault and when the user reaches the resolution point, the user interface presents the diagnostic image to said user.

In yet another exemplary embodiment, the knowledge base includes a resolution of the fault and when the user reaches the resolution point, the user interface presents the resolution to the user.

Accordingly, a user may access the system of the present invention to diagnose and resolve a technical problem associated with a technical product or service by responding to the queries presented to the user by the system with the aid of images that assist the user in identifying the symptoms associated with the technical problem. Once the user responds to all the queries presented by the system, the user is presented with an image of the diagnosed problem, thereby confirming the diagnosis, and a resolution to the technical problem. Thus remote diagnostic and remedial services for technical and engineering problems is provided.

The invention accordingly comprises the features of construction, combination of elements and arrangement of parts that will be exemplified in the following detailed disclosure, and the scope of the invention will be indicated in the claims. Other features and advantages of the invention will be apparent from the description, the drawings and the claims.

DESCRIPTION OF THE DRAWINGS

For a fuller understanding of the invention, reference is made to the following description taken in conjunction with the accompanying drawings, in which.

DETAILED DESCRIPTION OF THE PREFERRED EMBODIMENTS

Figure 1:
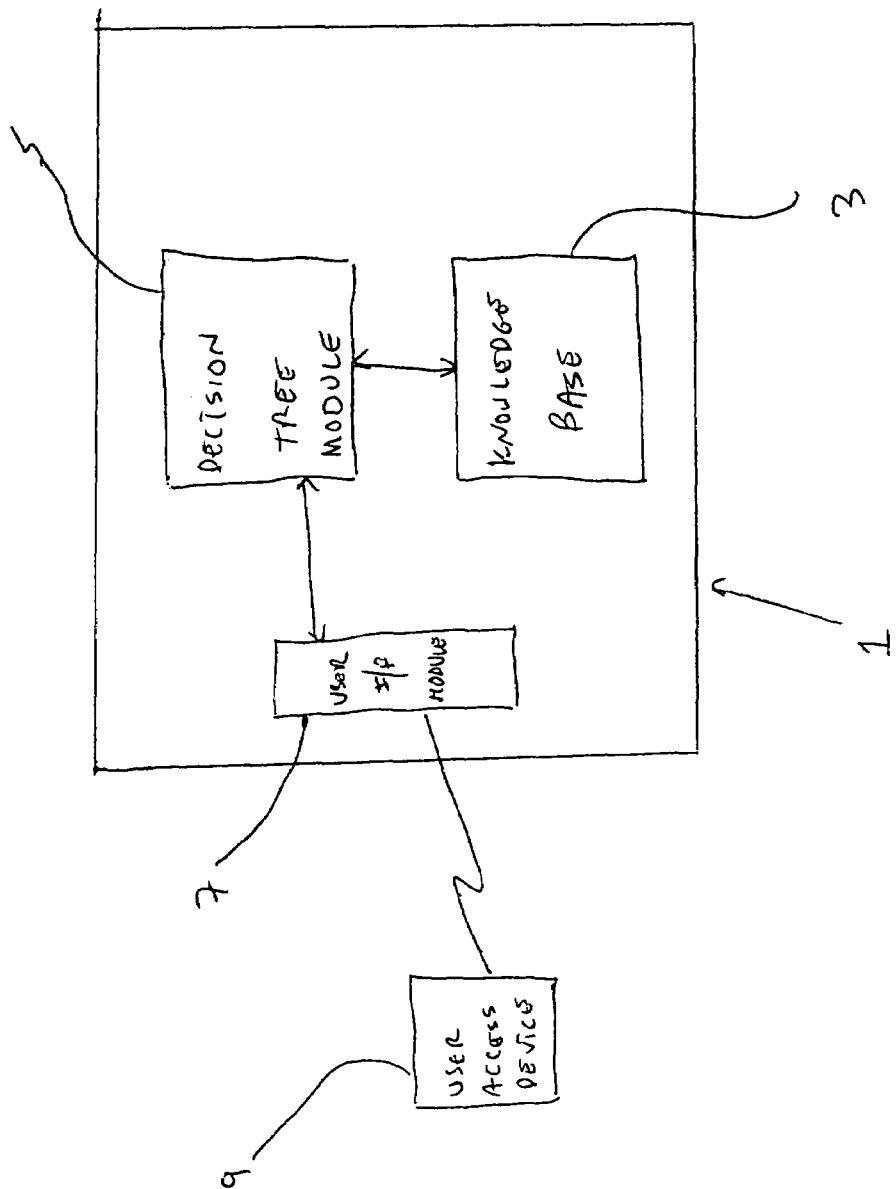
FIG. 1 is block diagram of a system for providing remote diagnostic and remedial services in accordance with the present invention.

Referring now to FIG. 1, there is shown a system 1 for providing remote diagnostic and remedial services in accordance with the present invention. System 1 includes a knowledge base 3 that stores diagnostic and remedial information. Also included in system 1 is a decision tree module 5 that is in communication with knowledge base 3 and that is used to present the information contained in knowledge base 3 in a diagnostically useful format. In an alternative embodiment, knowledge base 3 and decision tree module 5 are integrated. System 1 also includes a user interface module 7 for providing a user access device 9 with access to decision tree module 5 and knowledge base 3 of system 1. The user access device 9 may be, for example, a personal computer that communicates with system 1 via the Internet according to techniques well known in the art.

Figure 2:
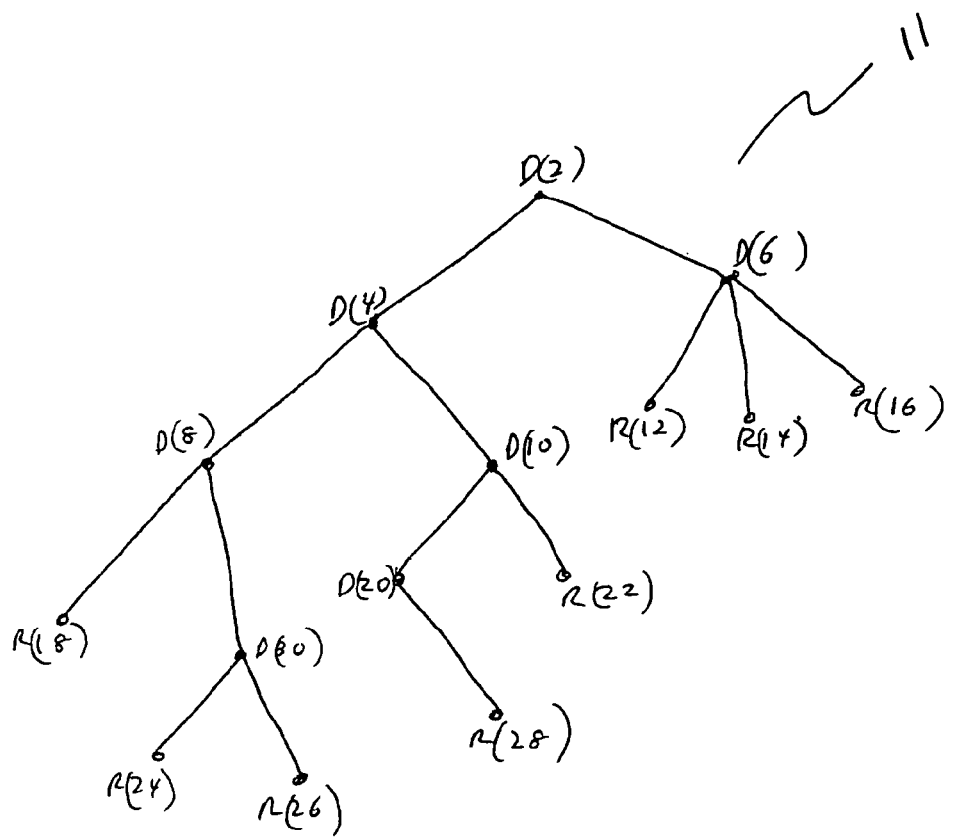
FIG. 2 is a drawing of a decision tree for diagnosing faults that is included in the system of FIG. 1.

Referring now to FIG. 2, there is shown a decision tree 11 that is contained in decision tree module 5 that is used to diagnose a particular fault. Decision tree 11 is made up of a plurality of decision points D(2), D(4), D(6), D(8), D(10), D(20) and D(30), as well as a plurality of resolution points R(12), R(14), R(16), R(18), R(22), R(24), R(26) and R(28). Each of decision points D have associated therewith a query designed to identify a symptom of the fault thereby leading to an eventual diagnosis. Each query has associated therewith a number of potential responses to the query from which a user, via the user access device 9, may choose where each of the responses identifies a possible symptom of the fault. In order to guide the user in identifying the correct symptoms and thus choosing the appropriate response, an image illustrating each of the symptoms associated with the responses is retrieved from knowledge base 3 and displayed to the user access device 9. By comparing the visual symptoms of the fault to be diagnosed to the images associated with each response, the user is aided in identifying the symptoms of the fault and selecting the correct response to the query. Thus, by navigating decision tree 11 to a resolution point R with the guidance of illustrative images, a diagnosis of the fault can be made without necessarily requiring an engineer to observe the fault first hand.

Figure 3:
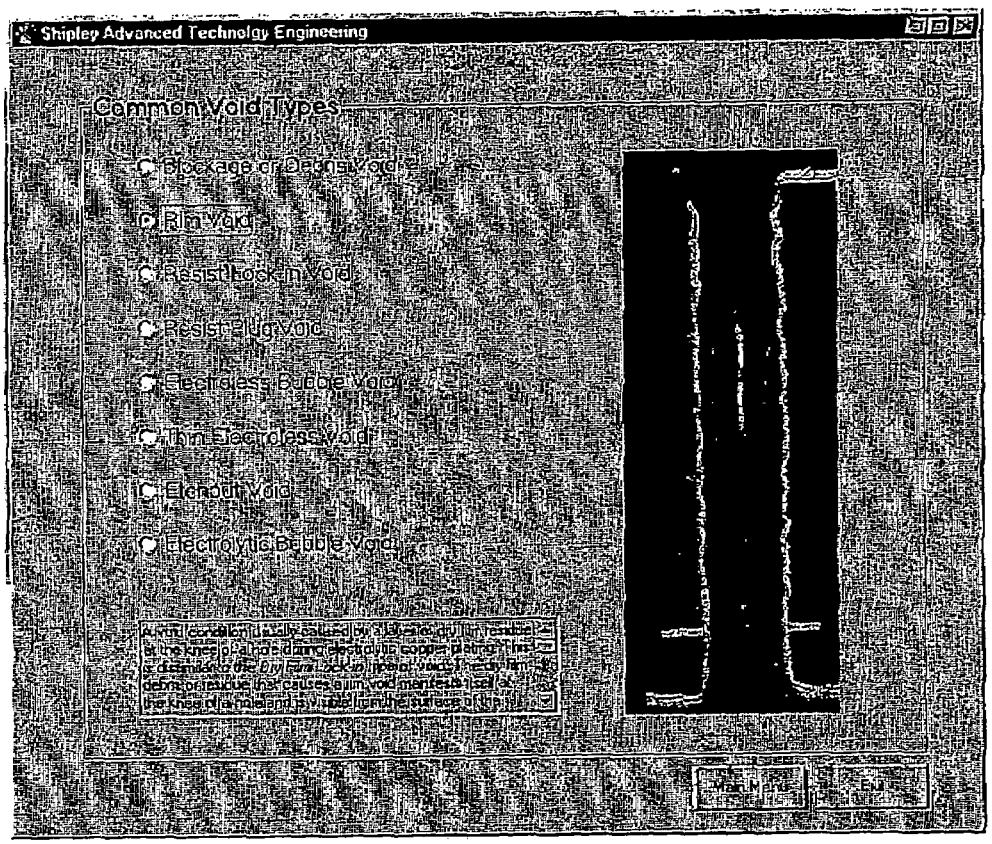
FIG. 3 is a screenshot of an image depicting a rim void.
Figure 4:
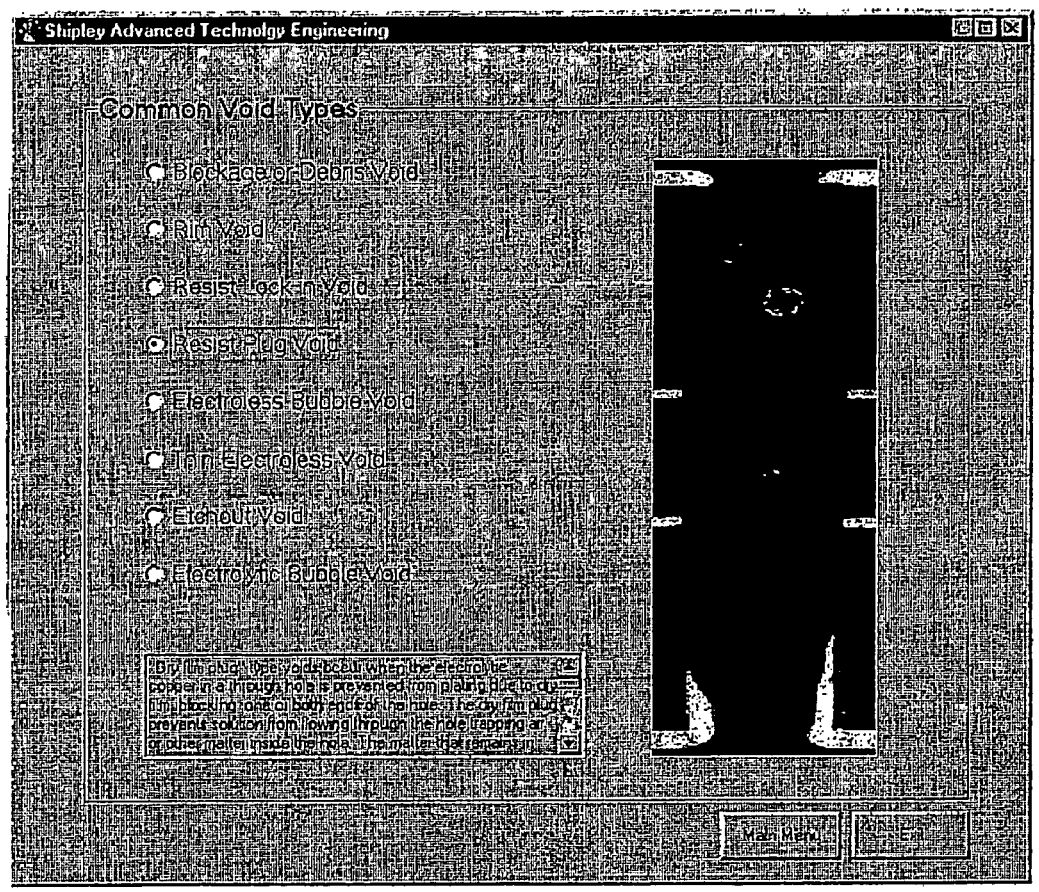
FIG. 4 is a screenshot of an image depicting a resist plug void.

For example, if the user is using system 1 to diagnose a defective circuit board, then the query associated with decision point D(30) may be directed to determining what type of void defect the circuit board has. Associated with the query of decision point D(3) are two potential responses—a rim void or a resist plug void—from which the user may select as a response to the query. Displayed on the user access device 9 are images 30 and 40, shown in FIGS. 3 and 4, respectively, that are stored in knowledge base 3 and which illustrate to the user the appearance of a rim void and a resist plug void, respectively. By comparing the defective circuit board to images 1 and 3, the user can more accurately determine which type of void defect has caused the circuit board to fail. Based on the comparison, the user, via the user access device 9, will either navigate decision tree 11 to resolution point R(24) or R(26) at which point the type of defect causing the circuit board to fail will have been uniquely identified as either a rim void or a resist plug void.

Figure 5:
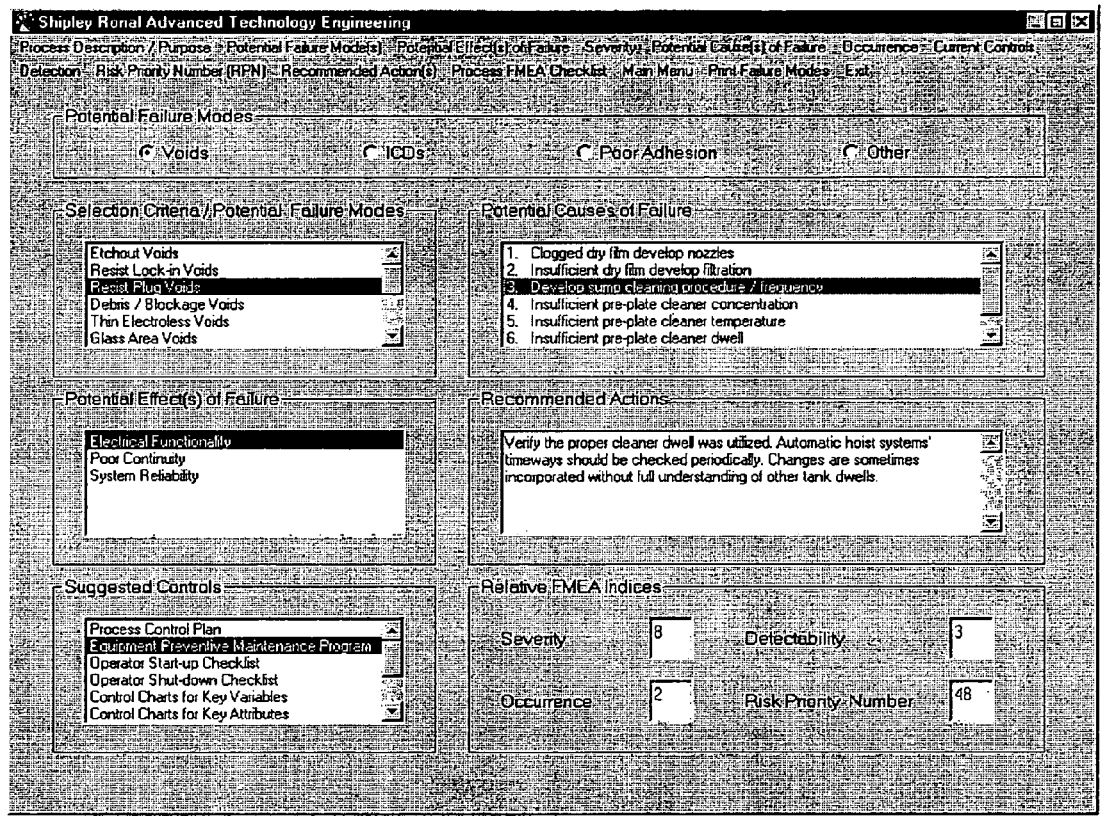
FIG. 5 is a screenshot displaying the likely causes for resist plug voids and recommended remedial actions.

Thus, decision tree 11 is constructed so that once navigation of decision tree 11 reaches a resolution point, sufficient symptoms have been provided to uniquely identify the fault. In addition, upon reaching a resolution point, a diagnostic image illustrating the fault is retrieved from knowledge base 3 and displayed on the user access device 9 so that the user can visually confirm that the diagnosis is correct. Also retrieved from knowledge base 3 and provided to the user via the user access device 9 is information describing the likely causes of the diagnosed fault as well as the resolution of the fault. For example, if navigation of decision tree 11 resulted in a diagnosis that a resist plug void was the cause of board failure, then displayed on the user access device 9, as shown in FIG. 5, are the likely causes for resist plug voids and recommended remedial actions. Accordingly, by navigating decision tree 11 and reaching a resolution point, user is presented, via the user access device 9, with a diagnosis of the fault in question, a diagnostic image illustrating the fault, likely cases of the fault and recommended remedial actions.

The diagnostic information may be presented to the user in any suitable manner in which the user can reach a resolution of the fault to be diagnosed. For example, decision tree 11 may be constructed to include decision points having queries with more than two possible responses from which to choose with an image illustrating each response. Also, in certain situations where the diagnosis of the fault is complex, the user may be required to traverse several decision points to reach a resolution point and thus determine the cause and remedy of the fault. In addition, system 1 may present to the user, via the user access device 9, all the resolution points and allow the user to compare the fault to be diagnosed to the illustrative images associated with each of the resolution points so that the user can directly diagnose the fault without having to respond to queries for traversing decision tree 11. The diagnostic information contained in knowledge base 3 may similarly be arranged and presented to the user, via the user access device 9, in any manner that enables the user to diagnose the fault in question.

Accordingly, a system and method is provided to remotely diagnose and resolve a technical problem associated with a product or service. By using the system and product of the present invention, remote diagnosis and remediation is provided while eliminating, or greatly reducing, the need for technical personnel to actively participate in the technical support process.

It will thus be seen that the objects set forth above, among those made apparent from the preceding description, are efficiently attained and, since certain changes may be made in carrying out the above process, in a described product, and in the construction set forth without departing from the spirit and scope of the invention, it is intended that all matter contained in the above description shown in the accompanying drawing shall be interpreted as illustrative and not in a limiting sense.

It is also to be understood that the following claims are intended to cover all of the generic and specific features of the invention herein described, and all statements of the scope of the invention, which, as matter of language, might be said to fall therebetween.

The invention claimed is:

1. A system for diagnosing a fault, the system comprising:
a knowledge base including a plurality of fault diagnoses and fault symptom queries, wherein each said fault symptom query includes potential responses and images that correspond to the potential responses;
a decision tree module including a decision tree having a plurality of decision points each corresponding to one of the fault symptom queries and a plurality of resolution points each corresponding to one of the fault diagnoses, wherein each said potential response in the decision tree indicates one of the decision points or one of the resolution points and one of said decision points is identified as a starting decision point; and
a user interface module in communication with said decision tree module, said knowledge base and a user access device, said user interface module including instructions to implement a method comprising:
designating the starting decision point as the next decision point;
transmitting the fault symptom query corresponding to the next decision point and an option to view all of the resolution points to the user access device;
receiving a reply to the query;
determining if the reply includes one of the potential responses or if the reply includes a request to view all of the decision points;
in response to determining that the reply includes one of the potential responses;
continuing said transmitting, receiving, and determining until said one of the potential responses indicates one of the resolution points or until it is determined that the reply includes a request to view all of the decision points, wherein if said one of the potential responses indicates one of the decision points then said one of the decision points is designated as the next decision point; and transmitting the fault diagnosis corresponding to said one of the resolution points to the user access device; and in response to determining that the reply includes a request to view all of the resolution points;

transmitting diagnostic images associated with each of the resolution points in the decision tree to the user access device, thereby allowing a user to diagnose a fault without having to respond to queries for traversing the decision tree.

2. The system of claim 1 wherein said fault diagnoses include one or more of the diagnostic images.

3. The system of claim 1 wherein said fault diagnoses include a description of the fault.

4. The system of claim 1 wherein said fault diagnoses include a likely cause of the fault.

5. The system of claim 1 wherein said fault diagnoses include recommended remedial actions.

6. The system of claim 1 wherein a user accessing the user access device is a customer.

7. The system of claim 1 wherein a user accessing the user access device is a customer support representative.

8. The system of claim 1 wherein the fault relates to a technical product.

9. The system of claim 1 wherein the fault relates to a technical service.

10. The system of claim 1 wherein the user access device is a personal computer.

11. The system of claim 1 wherein the communication between the user interface module and the user access device is via the Internet.

12. The system of claim 1 wherein the fault is a defective circuit board.

13. The system of claim 12 wherein the fault symptom query is directed to a determination of what type of defect the defective circuit board contains.

14. A method for diagnosing a fault, the method comprising:

identifying a starting decision point on a decision tree, wherein the decision tree includes a plurality of decision points each corresponding to a fault symptom query and a plurality of resolution points each corresponding to a fault diagnosis, wherein each said fault symptom query includes potential responses and images that correspond to the potential responses and each said potential response in the decision tree indicates one of the decision points or one of the resolution points;

designating the starting decision point as the next decision point;

transmitting the fault symptom query corresponding to the next decision point and an option to view all of the resolution points to a user access device;

receiving a reply to the query;

determining if the reply includes one of the potential responses or if the reply includes a request to view all of the decision points;

in response to determining that the reply includes one of the potential responses:

continuing said transmitting, receiving, and determining until said one of the potential responses indicates one of the resolution points or until it is determined that the reply includes a request to view all of the decision points, wherein if said one of the potential responses indicates one of the decision points then said one of the decision points is designated as the next decision point; and transmitting the fault diagnosis corresponding to said one of the resolution points to the user access device; and in response to determining that the reply includes a request to view all of the resolution points:

transmitting diagnostic images associated with each of the resolution points in the decision tree to the user access device, thereby allowing a user to diagnose a fault without having to respond to queries for traversing the decision tree.

15. The method of claim 14 wherein the fault diagnoses include one or more of the diagnostic images.

16. The method of claim 14 the fault diagnoses include a description of the fault.

17. The method of claim 14 wherein the fault diagnoses include a likely cause of the fault.

18. The method of claim 14 wherein said fault diagnoses include recommended remedial actions.

19. The method of claim 14 wherein the fault relates to a technical product or technical service.

20. A computer implemented system for diagnosing a fault, the system comprising:

a knowledge base including a plurality of fault diagnoses and fault symptom queries, wherein each said fault symptom query includes potential responses and images that correspond to the potential responses;

a decision tree module including a decision tree having a plurality of decision points each corresponding to one of the fault symptom queries and a plurality of resolution points each corresponding to one of the fault diagnoses, wherein each said potential response in the decision tree indicates one of the decision points or one of the resolution points and one of said decision points is identified as a starting decision point; and a user interface module in communication with said decision tree module, said knowledge base and a user access device, said user interface module including instructions to implement a method comprising:

designating the starting decision point as the next decision point;

transmitting the fault symptom query corresponding to the next decision point and an option to view all of the resolution points to the user access device;

receiving a reply to the query;

determining if the reply includes one of the potential responses or if the reply includes a request to view of the decision points;

in response to determining that the reply includes one of the potential responses:

continuing said transmitting, receiving, and determining until said one of the potential responses indicates one of the resolution points or until it is determined that the reply includes a request to view all of the decision points, wherein if said one of the potential responses indicates one of the decision points then said one of the decision points is designated as the next decision point; and transmitting the fault diagnosis corresponding to said one of the resolution points to the user access device; and in response determining that the reply includes a request to view all of the resolution points:

transmitting diagnostic images associated with each of the resolution points in the decision tree to the user access device, thereby allowing a user to diagnose a fault without having to respond to queries for traversing the decision tree.

21. A system for diagnosing defects in circuit boards, the system comprising:

a knowledge base including a plurality of fault diagnoses and fault symptom queries, wherein said fault diagnoses include diagnostic images, a description of the fault, and a likely cause of the fault, wherein each said fault symptom query includes potential responses and images that correspond to the potential responses, one of said fault symptom queries isolating a type of defect, said images corresponding to said potential responses including a rim defect image and a resist plug defect images;

a decision tree module including a decision tree having a plurality of decision points each corresponding to one of the fault symptom queries and a plurality of resolution points each corresponding to one of the fault diagnoses, wherein each said potential response in the decision tree indicates one of the decision points or one of the resolution points and one of said decision points is identified as a starting decision point; and a user interface module for providing customer support, said user interface module being in communication with said decision tree module, said knowledge base and a user access device, said user interface module including instructions to implement a method comprising:

designating the starting decision point as the next decision point;

transmitting the fault symptom query corresponding to the next decision point and an option to view all of the resolution points to the user access device;

receiving a reply to the query;

determining if the reply includes one of the potential responses or if the reply includes a request to view all of the decision points;

in response to determining that the replay includes one of the potential responses:

continuing said transmitting, receiving, and determining until said one of the potential responses indicates one of the resolution points or until it is determined that the reply includes a request to view all of the decision points, wherein it said one of the potential responses indicates one of the decision points then said one of the decision points is designated as the next decision point; and transmitting the fault diagnosis corresponding to said one of the resolution points to the user access device, said fault diagnosis including said type of defect; and in response to determining that the reply includes a request to view all of the resolution points:

transmitting diagnosis images associated with each of the resolution points in the decision tree to the user access device, thereby allowing a user to diagnose a fault without having to respond to queries for traversing the decision tree.

22. The system of claim 21, wherein said instructions further comprise:

transmitting a recommended remedial action based on the fault diagnosis to the user access device.

23. The system of claim 1 wherein the option to view all of the resolution points includes only those decision points beneath the next decision point.

24. The system of claim 1 wherein the option to view all of the resolution points includes all of the resolution points in the decision tree.

* * * * *